United States Patent
Ohkawa et al.

(10) Patent No.: US 10,093,180 B2
(45) Date of Patent: Oct. 9, 2018

(54) TRANSFER DEVICE FOR FOUR-WHEEL DRIVE VEHICLE

(71) Applicant: Mazda Motor Corporation, Aki-gun, Hiroshima (JP)

(72) Inventors: Yuzo Ohkawa, Hiroshima (JP); Hideki Murata, Hiroshima (JP); Eiji Mito, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 292 days.

(21) Appl. No.: 15/224,307

(22) Filed: Jul. 29, 2016

(65) Prior Publication Data
US 2017/0028845 A1 Feb. 2, 2017

(30) Foreign Application Priority Data

Jul. 30, 2015 (JP) .................................. 2015-151051
Sep. 29, 2015 (JP) .................................. 2015-191827

(51) Int. Cl.
| | |
|---|---|
| *F16D 3/223* | (2011.01) |
| *F16F 15/124* | (2006.01) |
| *B60K 17/344* | (2006.01) |
| *B60K 17/35* | (2006.01) |

(52) U.S. Cl.
CPC .......... *B60K 17/344* (2013.01); *B60K 17/351* (2013.01); *F16D 3/223* (2013.01); *F16F 15/1245* (2013.01)

(58) Field of Classification Search
CPC ..... B60K 17/344; F16D 3/223; F16F 15/1245
USPC ............................... 74/665 F, 665 G, 665 GA
See application file for complete search history.

(56) References Cited

U.S. PATENT DOCUMENTS

| | | | | |
|---|---|---|---|---|
| 5,655,983 A | * | 8/1997 | Dick .................. | B60K 17/3505 418/32 |
| 5,702,319 A | * | 12/1997 | Baxter, Jr. ......... | B60K 17/3465 418/32 |
| 6,945,896 B2 | * | 9/2005 | Pelchen ............... | B60K 17/344 475/159 |

(Continued)

FOREIGN PATENT DOCUMENTS

| | | |
|---|---|---|
| JP | H0287162 U | 7/1990 |
| JP | H04228953 A | 8/1992 |

(Continued)

*Primary Examiner* — Ha Dinh Ho
(74) *Attorney, Agent, or Firm* — Alleman Hall Creasman & Tuttle LLP

(57) ABSTRACT

A transfer device of a vehicle is provided, which includes an input shaft for receiving an output torque of a drive source at an axial first side, a main-wheel output part provided on a second side and for outputting the output torque to main drive wheels, an auxiliary-wheel output shaft provided in parallel to the input shaft and for outputting the output torque to auxiliary drive wheels, a coupling provided on the input shaft and for extracting a part of the output torque, a drive member having a hollow section and provided on the input shaft, a driven member provided on the auxiliary-wheel output shaft and meshed with the drive member, a universal joint provided on the auxiliary-wheel output shaft, and a damper device provided on the input shaft or the auxiliary-wheel output shaft and for reducing noise that occurs due to a variation of the output torque.

20 Claims, 8 Drawing Sheets

FORWARD    REARWARD

(56) References Cited

U.S. PATENT DOCUMENTS

| | | | |
|---|---|---|---|
| 7,186,199 B1 * | 3/2007 | Baxter, Jr. | B60K 17/3462 |
| | | | 475/206 |
| 8,690,690 B2 * | 4/2014 | Conger | F16D 1/116 |
| | | | 464/146 |
| 8,985,291 B2 * | 3/2015 | Iqbal | F16D 3/12 |
| | | | 192/112 |

FOREIGN PATENT DOCUMENTS

| | | |
|---|---|---|
| JP | H07186751 A | 7/1995 |
| JP | 2002337562 A | 11/2002 |
| JP | 2009257432 A | 11/2009 |

* cited by examiner

TRANSFER DEVICE FOR FOUR-WHEEL DRIVE VEHICLE

CROSS REFERENCE TO RELATED APPLICATIONS

This application claims priority to Japanese patent applications JP2015-191827 filed on Sep. 29, 2015 and JP2015-151051 filed on Jul. 30, 2015. The entire contents of all of these applications are hereby incorporated by reference for all purposes. BACKGROUND The present invention relates to a transfer device, which is mounted on a four-wheel drive vehicle.

Four-wheel drive vehicles provided with a drive source (e.g., engine), a transmission, and a transfer device are known. The drive source and the transmission are arranged in a front part of a vehicle body so that axes thereof extend in front-and-rear directions of the vehicle body. The transfer device outputs an output torque of the drive source transmitted from an output part of the transmission, to rear wheels (main drive wheels) via a rear-wheel propeller shaft extending rearward and a rear-wheel differential. The transfer device also extracts a part of the output torque and outputs it to front wheels (auxiliary drive wheels). Such a four-wheel drive vehicle outputs part of the output torque of the drive source, which is extracted by the transfer device, to the front wheels via a front-wheel propeller shaft extending forward and a front-wheel differential. Thus, not only the rear wheels, but also the front wheels are drivable.

In the four-wheel drive vehicle, a coupling for extracting the torque from the front wheels is provided to the transfer device. By completely engaging the coupling, the vehicle enters a four-wheel drive state where the output torque of the drive source is evenly transmitted to the front and rear wheels. By completely releasing the coupling, the vehicle enters a two-wheel drive state where the output torque of the drive source is transmitted to the rear wheels alone. When the engagement state of the coupling is between complete engagement and complete release, the torque distribution to the front wheels is adjusted according to the engagement state.

For example, JP2009-257432A discloses a transfer device mounted on such a four-wheel drive vehicle. In the transfer device of JP2009-257432A, a coupling for extracting a torque from the front wheels (front torque) is provided to an input shaft to which an output torque of a drive source is transmitted from an output part of a transmission, and the output torque of the drive source extracted by the coupling is transmitted to a drive sprocket provided on the input shaft, a driven sprocket coupled to the drive sprocket by a chain, and a front-wheel output shaft arranged in parallel to the input shaft and to which the driven sprocket is fixed. Thus, not only the rear wheels, but also the front wheels are drivable.

In the four-wheel drive vehicle on which the transfer device having the above structure is mounted, especially when the drive source is an engine, the output torque of the engine varies due to intermittent explosions occurring within a combustion chamber of the engine, and the torque variation is transmitted to the transfer device via the transmission.

Therefore, when the front torque extracted by the coupling is comparatively low, depending on the frequency of the torque variation of the engine, a front-wheel drivetrain, which has a predetermined characteristic frequency of vibration with respect to torsional vibration and reaches the front wheels via the coupling, resonates with the frequency of the torque variation of the engine and causes large vibrations in the drivetrain. Due to these vibrations, the teeth of the gears provided in the drivetrain may rattle against each other, causing noise.

To address these vibrations in the drivetrain, one consideration may be to increase the torque distribution to the front wheels via the coupling by applying a load on the drivetrain in order to increase the front torque within an operating range where the drivetrain resonates with the torque variation of the output torque of the engine. Thus, the rattling of the teeth caused by the resonance of the drivetrain may be reduced. However, this would also lead to increases in drive loss and a degradation of fuel economy. Therefore, it is desirable to reduce the rattling of the teeth between the gears caused by the resonance of the drivetrain, without increasing the torque distribution to the front wheels.

In this regard, another consideration may be to dispose a damper device for reducing the rattling sound of the teeth between the gears provided in the drivetrain. However, by disposing the damper device, the transfer device may increase in size, which may degrade vehicle mountability and passenger comfort, for example. Therefore, it is desirable to compactly configure the transfer device while reducing the rattling sound of the teeth between the gears.

SUMMARY

Therefore, the present invention is made in view of the above issues and aims to provide a transfer device, which is mounted on a four-wheel drive vehicle and capable of reducing the rattling sound of the teeth between the gears therein while having a compact structure.

For addressing the above issues, the present invention is characterized by being configured as follows.

According to one aspect of the present invention, a transfer device of a vehicle comprises an input shaft configured to receive an output torque of a drive source at an axial first side of the input shaft in axial directions thereof, a main-wheel output part provided on an axial second side of the input shaft and configured to output the output torque of the drive source to main drive wheels, the axial second side being opposite from the axial first side in the axial directions; an auxiliary-wheel output shaft provided in parallel to the input shaft and configured to output the output torque of the drive source to auxiliary drive wheels; a coupling provided on the input shaft and configured to extract a part of the output torque that is outputted to the auxiliary drive wheels; a drive member having a hollow section and provided on the input shaft; a driven member provided on the auxiliary-wheel output shaft and meshed with the drive member; and a damper device provided on one of the input shaft and the auxiliary-wheel output shaft and configured to reduce noise that occurs due to a variation of the output torque of the drive source. When the damper device is provided on the input shaft, the drive member includes a first-side extension part and a second-side extension part extending to the axial first side and the axial second side in axial directions, respectively, the drive member is supported to a transfer case via a drive member bearing provided between the first-side extension part and the transfer case, and another drive member bearing provided between the second-side extension part and the transfer case, a coupling part fitted to an inner circumferential side of the second-side extension part of the drive member and coupled to the drive member, the coupling part being provided to the coupling, the damper device is disposed between the coupling and the drive member, and an inner circumferential part of the damper device is coupled to the coupling part and an outer circumferential part of the damper device is coupled to an outer circumferential side of the second-side extension part of the drive member.

With the above configuration, the coupling can be supported to the transfer case via a drive member bearing provided between the first-side extension part and the transfer case, and another drive member bearing provided between the second-side extension part and the transfer case. This allows the transfer case to be structure more compactly in the axial directions of the input shaft, compared to a case in which the bearing that supports the coupling to the transfer case is provided on an axial second side of the drive member bearing. Moreover, since the damper device is provided between the coupling and the drive member, the transfer device can be made more compact via an outer circumferential part that is coupled to an outer circumferential side of the second-side extension part of the drive member. Furthermore, the coupling and the drive member are coupled by the damper device, so that noise caused by gear teeth rattling against each other can be suppressed.

A universal joint is provided on the auxiliary-wheel output shaft. When the damper device is provided on the auxiliary-wheel output shaft, the damper device is disposed at least on one of axial first side and axial second side of the universal joint in the axial directions of the auxiliary-wheel output shaft.

With this configuration, the dimensions of the driven member in the radial direction can be minimized, so that an increase in torque variation and noise can be suppressed without degrading vehicle mountability.

A transfer device of a vehicle, comprises an input shaft configured to receive an output torque of a drive source at an axial first side of the input shaft in axial directions thereof; a main-wheel output part provided on an axial second side of the input shaft and configured to output the output torque of the drive source to main drive wheels, the axial second side being opposite from the axial first side in the axial direction; an auxiliary-wheel output shaft provided in parallel to the input shaft and configured to output the output torque of the drive source to auxiliary drive wheels; a coupling provided on the input shaft and configured to extract a part of the output torque that is outputted to the auxiliary drive wheels; a drive member having a hollow section and provided on the input shaft; and a driven member provided on the auxiliary-wheel output shaft and meshed with the drive member. The drive member includes a first-side extension part and a second-side extension part extending to the axial first side and the axial second side in axial directions, respectively. The drive member is supported to a transfer case via a drive member bearing provided between the first-side extension part and the transfer case, and another drive member bearing provided between the second-side extension part and the transfer case. A coupling part is fitted to an inner circumferential side of the second-side extension part of the drive member and coupled to the drive member, the coupling part being provided to the coupling. A damper device is disposed between the coupling and the drive member, and an inner circumferential part of the damper device is coupled to the coupling part and an outer circumferential part of the damper device is coupled to an outer circumferential side of the second-side extension part of the drive member.

With the above configuration, the coupling can be supported to the transfer case via a drive member bearing provided between the first-side extension part and the transfer case, and another drive member bearing provided between the second-side extension part and the transfer case. This allows the transfer case to be structure more compactly in the axial directions of the input shaft, compared to a case in which the bearing that supports the coupling to the transfer case is provided on an axial second side of the drive member bearing. Moreover, since the damper device is provided between the coupling and the drive member, the transfer device can be made more compact via an outer circumferential part that is coupled to an outer circumferential side of the second-side extension part of the drive member. Furthermore, the coupling and the drive member are coupled by the damper device, so that noise caused by gear teeth rattling against each other can be suppressed.

The coupling includes an inner rotary member coupled to the input shaft; an outer rotary member coupled to the damper device; friction plates disposed between the inner and outer rotary members; and a coupling bearing provided on an axial first side of the friction plates, between the inner and outer rotary members. The damper device and the coupling bearing overlap each other in the axial directions.

With the above configuration, the overlapping configuration allows the dimensions of the transfer device to be made more compact.

The main-wheel output part is a main-wheel output shaft coaxially coupled to the input shaft and configured to output the output torque of the drive source to the main drive wheels. A second-side axial end part of the input shaft on the axial second side of the input shaft is fitted to the main-wheel output shaft by being inserted into a concave section formed in a first-side axial end part of the main-wheel output shaft, and the fitted section of the input shaft and the main-wheel output shaft overlap the coupling bearing in the axial directions.

With the above configuration, the fitted section of the input shaft and the main-wheel output shaft can be stabilized and supported onto the transfer case via the drive member bearing and the coupling bearing, since the fitted section is supported onto the outer rotary member via the coupling bearing.

A transfer device of a vehicle, comprises an input shaft configured to receive an output torque of a drive source at an axial first side of the input shaft in axial directions thereof; a main-wheel output part provided on an axial second side of the input shaft and configured to output the output torque of the drive source to main drive wheels, the axial second side being opposite from the axial first side in the axial directions; an auxiliary-wheel output shaft provided in parallel to the input shaft and configured to output the output torque of the drive source to auxiliary drive wheels; a coupling provided on the input shaft and configured to extract a part of the output torque that is outputted to the auxiliary drive wheels; a drive member having a hollow section and provided on the input shaft; a driven member provided on the auxiliary-wheel output shaft and meshed with the drive member; a universal joint provided on the auxiliary-wheel output shaft, the universal joint having an axial first side and an axial second side; and a damper device disposed at least on one of the axial first side and axial second side of the universal joint, and configured to reduce noise that occurs due to a variation of the output torque of the drive source.

With the above configuration, the dimensions of the driven member in the radial direction can be minimized, so that an increase in torque variation and noise can be suppressed without degrading vehicle mountability.

A transmission is attached to the axial first side of the transfer device, and the damper device is disposed on the axial second side of the universal joint.

With the above configuration, since the transmission and damper device are spatially separated, there is reduced risk of the two components interfering with the operations of each other.

A first-side bearing and a second-side bearing configured to support the driven member to a transfer case are disposed on the axial first side and axial second side of the universal joint, respectively, where the first-side bearing and the second-side bearing each have an axial first side and an axial second side, and the damper device is disposed on the axial second side of the second-side bearing.

With the above configuration, since there are no damper devices provided between the first-side bearing and the second-side bearing, it is possible to minimize the dimensions of the driven member in the length direction.

A coupling is provided on the input shaft, and the damper device overlaps the coupling in the axial directions of the input shaft.

With the above configuration, the overlapping configuration allows the transfer device to be configured more compactly in the axial directions.

The damper device includes an outer cylindrical member configured to communicate with the driven member; an inner cylindrical member coupled to the auxiliary-wheel output shaft; and an elastic member provided between the outer and inner cylindrical members and configured with a tolerance, the outer and inner cylindrical members rotating in relation to each other within the tolerance.

With the above configuration, the outer and inner cylindrical members can be provided with a tolerance that regulates their respective rotations.

A part of the outer cylindrical member supporting the elastic member has a larger diameter than a part of the outer cylindrical member communicating with the driven member.

With the above configuration, the dampening properties of the damper device can be improved by configuring a larger elastic member in the damper device.

An inner circumferential surface of the driven member and an outer circumferential surface of the auxiliary-wheel output shaft are coupled to each other via a coupled section so as to rotate in relation to each other, and a stopper mechanism, configured to limit a relative rotation amount of the damper device, is provided in the coupled section.

With the above configuration, the stopper mechanism can prevent an excessive torque from being applied on the damper device.

The auxiliary-wheel output shaft also functions as an outer joint member of the universal joint.

With the above configuration, the number of components in the transfer device is reduced to enable more compact configurations.

DETAILED DESCRIPTION OF EMBODIMENT

Hereinafter, one embodiment of the present invention is described with reference to the appended drawings.

Figure 1:
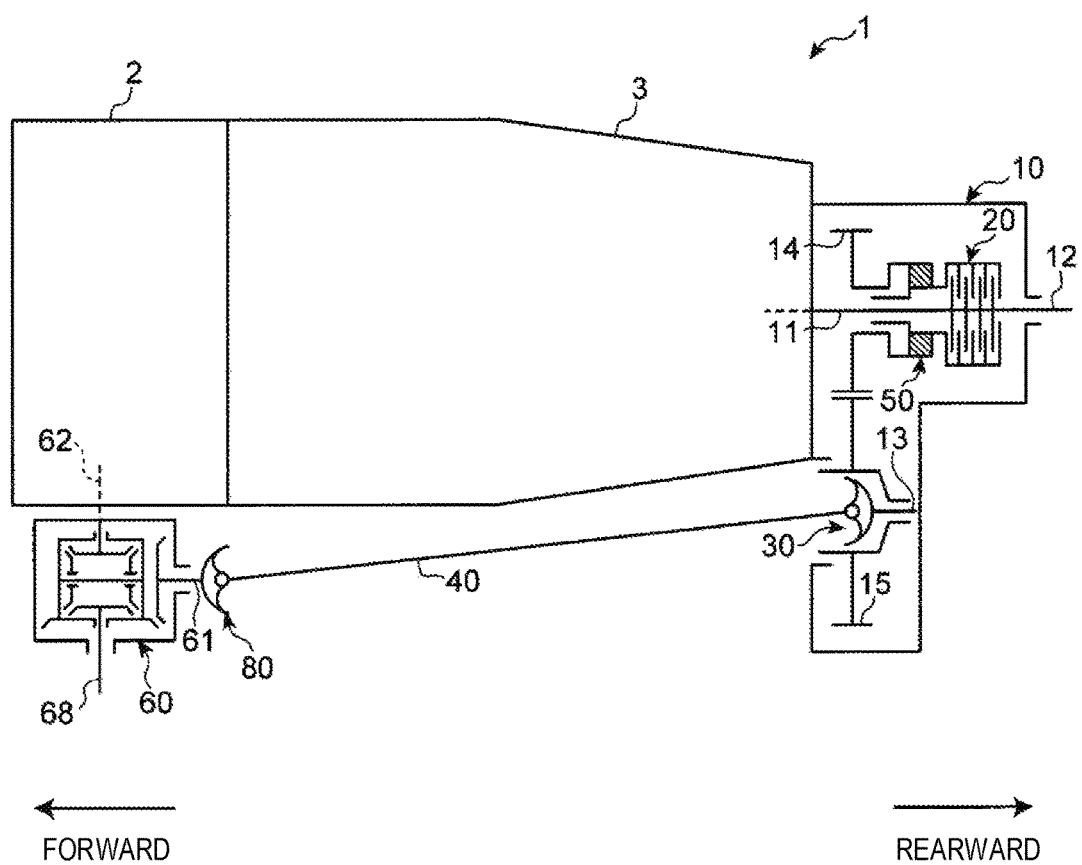
FIG. 1 is a schematic view illustrating a drive force transmission mechanism of a four-wheel drive vehicle on which a transfer device according to a first embodiment of the present invention is mounted.

FIG. 1 is a schematic view illustrating a drive force transmission mechanism of a four-wheel drive vehicle on which a transfer device according to the first embodiment of the present invention is mounted. As illustrated in FIG. 1, the four-wheel drive vehicle 1 on which the transfer device of this embodiment is mounted is a four-wheel drive vehicle of a front-engine, rear-wheel drive base, and includes an engine 2 (drive source) and a transmission 3 which are arranged in a front part of a vehicle body so that axes thereof extend in forward-and-rearward directions of the vehicle body (hereinafter, may simply be referred to as "the front side" or "forward" and "the rear side" or "rearward," respectively).

The transfer device 10 is disposed rearward of the transmission 3 and outputs an output torque of the engine 2 transmitted from an output part of the transmission 3, to rear wheels (main drive wheels) via a rear-wheel propeller shaft extending rearward and a rear-wheel differential, and extracts a part of the output torque for front wheels (auxiliary drive wheels).

The transfer device 10 includes an input shaft 11 for receiving the output torque of the engine 2 at the front side (one side of axial directions of the input shaft 11), a rear-wheel output part 12 provided rearward of the input shaft 11 (the other side of the axial directions of the input shaft 11) and for outputting the output torque of the engine 2 to the rear wheels, and a front-wheel output shaft 13 arranged in parallel to the input shaft 11 and for outputting the output torque of the engine 2 to the front wheels. In this embodiment, the rear-wheel output part 12 is formed by a rear-wheel output shaft 12 coaxially coupled to the input shaft 11 and for outputting the output torque of the engine 2 to the rear wheels.

The transfer device 10 also includes a coupling 20 provided on the input shaft 11 and coupled thereto, a drive gear 14 provided on the input shaft 11 at a forward position relative to the coupling 20 and coupled to the coupling 20, and a driven gear 15 provided on the front-wheel output shaft 13, coupled to the front-wheel output shaft 13, and meshed with the drive gear 14.

As the coupling 20, for example, an electromagnetic coupling may be used. The coupling 20 extracts a part of the output torque of the engine 2 to be outputted to the front wheels. The part of the output torque of the engine 2 extracted by the coupling 20 (hereinafter, may simply be referred to as the "front torque") is transmitted to the front-wheel output shaft 13 via the drive gear 14 and the driven gear 15.

The front-wheel output shaft 13 is coupled, via a first universal joint 30, to a front-wheel propeller shaft 40 extending forward. The front-wheel propeller shaft 40 is coupled to an input shaft 61 of a front-wheel differential 60 and a second universal joint 80, and the input shaft 61 of the front-wheel differential 60 is coupled to a drive axle 68 coupled to the left and right front wheels.

Thus, the front torque extracted by the coupling 20 is transmitted to the front-wheel output shaft 13 via the drive gear 14 and the driven gear 15, and further transmitted from the front-wheel output shaft 13 to the front wheels via the front-wheel propeller shaft 40 and the front-wheel differential 60. In the four-wheel drive vehicle 1, the coupling 20 varies a ratio of the torque to the front wheels and the rear wheels within a range between 0:100 and 50:50 (front wheels: rear wheels). It will be noted that the operation of the coupling 20 is controlled by a control unit (not illustrated).

The transfer device 10 also includes a damper device 50 disposed on the input shaft 11, at a position between the coupling 20 and the drive gear 14. The damper device 50 reduces a resonance frequency at which a front-wheel drivetrain resonates with a torque variation of the engine 2, to be below a practical range of the engine 2. The front-wheel drivetrain reaches the front wheels via the coupling 20, the drive gear 14, the driven gear 15, the front-wheel output shaft 13, the front-wheel propeller shaft 40, and the front-wheel differential 60.

Figure 2:
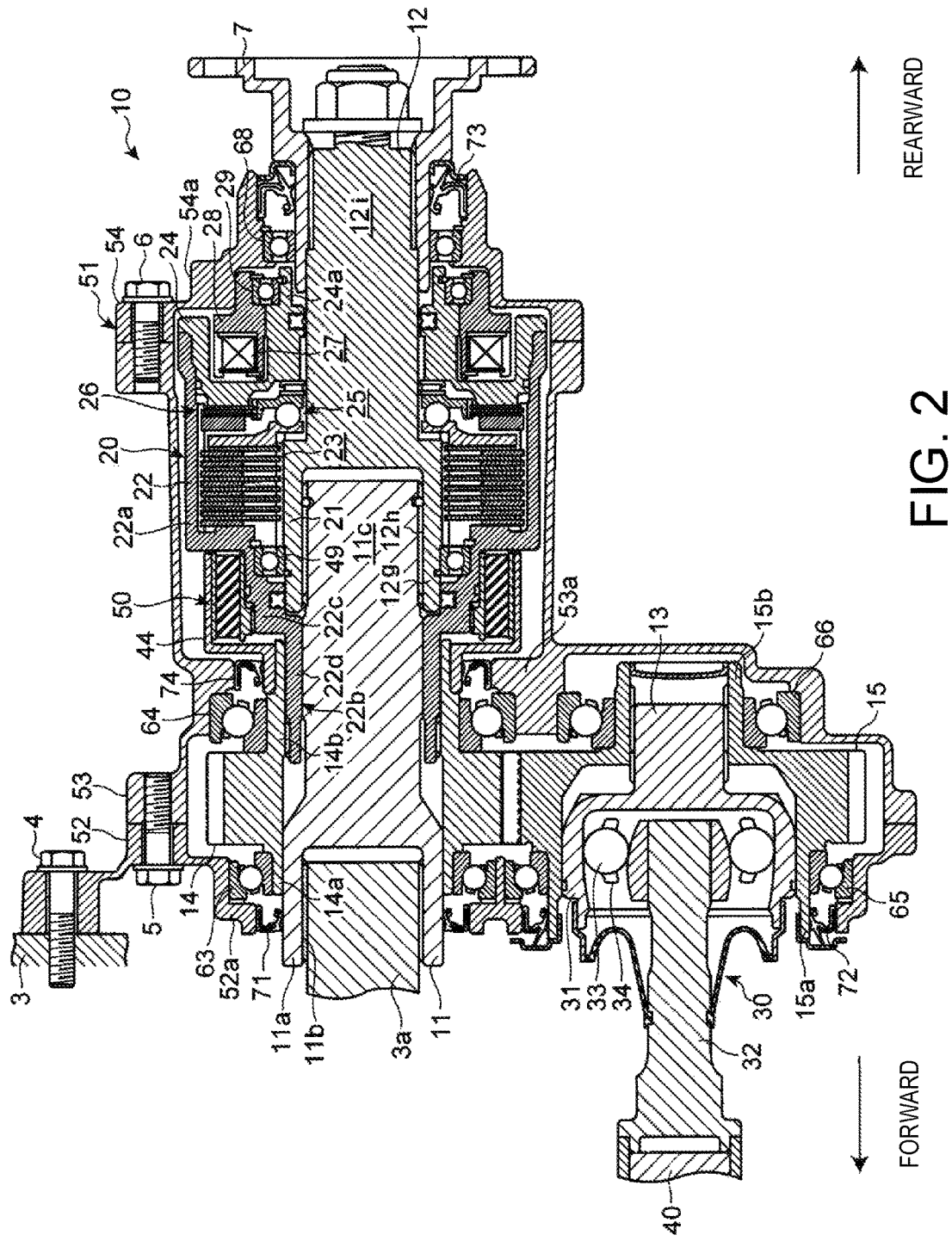
FIG. 2 is a cross-sectional view illustrating the transfer device.
Figure 3:
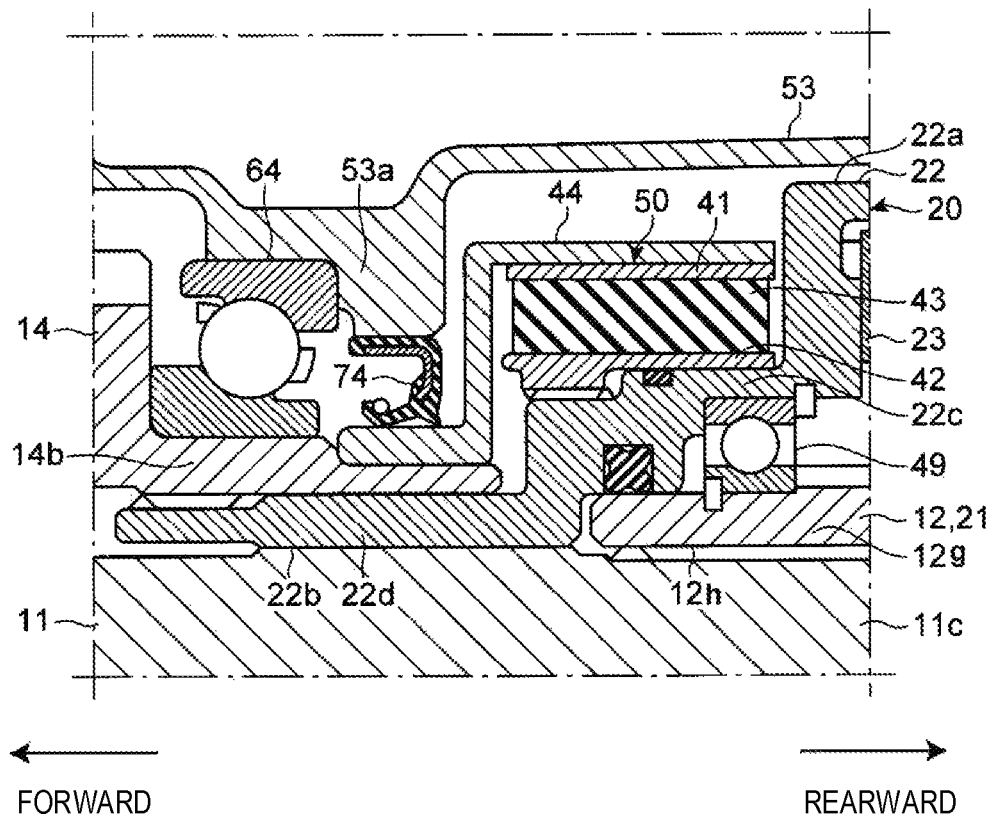
FIG. 3 is an enlarged view of a main part of the transfer device.

Next, the transfer device 10 of this embodiment is described more in detail with reference to FIGS. 2 and 3.

FIG. 2 is a cross-sectional view illustrating the transfer device. FIG. 3 is an enlarged view of a main part of the transfer device. As illustrated in FIG. 2, the transfer device 10 includes a transfer case 51 fixedly fastened to the transmission 3 by using a fastening bolt 4. The transfer case 51 has a split structure including a first case member 52, a second case member 53, and a third case member 54 arranged in this order from the front side. The first case member 52 is fixedly fastened to the second case member 53 by a fastening bolt 5, and the second case member 53 is fixedly fastened to the third case member 54 by a fastening bolt 6.

The input shaft 11 coupled to an output part 3a of the transmission 3, the rear-wheel output shaft 12 arranged rearward of the input shaft 11 to be coaxial therewith, and the front-wheel output shaft 13 arranged in parallel to the input shaft 11, are supported by the transfer case 51 to be rotatable therein.

The input shaft 11 has a front end part 11a formed with a concave section 11b and is spline-fitted to the output part 3a of the transmission 3 inserted into the concave section 11b, so that the input shaft 11 rotates with the output part 3a of the transmission 3. The input shaft 11 is also spline-fitted to the rear-wheel output shaft 12 by inserting a rear end part 11c of the input shaft 11 into a concave section 12h formed in a front end part 12g of the rear-wheel output shaft 12, so that the input shaft 11 rotates with the rear-wheel output shaft 12. The rear-wheel output shaft 12 is coupled to a coupling member 7 by spline-fitting a rear end part 12i to the coupling member 7 coupled to the rear-wheel propeller shaft.

In the transfer case 51, the drive gear 14 having a hollow section is provided on the input shaft 11 at a position between a vertical wall 52a of the first case member 52 and a vertical wall 53a of the second case member 53, the driven gear 15 is provided on the front-wheel output shaft 13, and the coupling 20 is provided on the rear-wheel output shaft 12 at a position between the vertical wall 53a of the second case member 53 and a vertical wall 54a of the third case member 54.

The coupling 20 includes an inner rotary member 21 coupled to the input shaft 11, an outer rotary member 22 coupled to the drive gear 14, and a plurality of friction plates 23 disposed between the inner and outer rotary members 21 and 22 to be alternately spline-engaged with the inner and outer rotary members 21 and 22. In this embodiment, the inner rotary member 21 is formed by the rear-wheel output shaft 12.

The coupling 20 also includes a cover member 24 coupled to the outer rotary member 22 at a position rearward of the plurality of friction plates 23 which are spline-engaged with the inner and outer rotary members 21 and 22, a cam mechanism 25 disposed between the plurality of friction plates 23 and the cover member 24 and for engaging the plurality of friction plates 23 with each other, and a clutch mechanism 26 disposed between the plurality of friction plates 23 and the cover member 24 and for operating the cam mechanism 25 by externally receiving a magnetic force.

The coupling 20 further includes a solenoid 27 at a position rearward of the cover member 24. Upon a power distribution control on the solenoid 27 by the control unit, the coupling 20 controls the engagement of the plurality of friction plates 23 via the clutch mechanism 26 and the cam mechanism 25. Thus, the front torque is variably controlled and extracted.

The solenoid 27 is fixed to the third case member 54 of the transfer case 51 via a cylindrical supporting member 28 supporting the solenoid 27. A coupling bearing 29 is provided between an inner circumferential surface of the supporting member 28 and an outer circumferential surface of a boss portion 24a provided in an inner circumferential part of the cover member 24 and extending rearward. The coupling 20 is rotatably supported, at a rear position, to the transfer case 51 via the coupling bearing 29.

The outer rotary member 22 of the coupling 20 includes a substantially-cylindrical main body part 22a to which the plurality of friction plates 23 are spline-engaged. The outer rotary member 22 of the coupling 20 is provided with a coupling part 22b coupled to the drive gear 14. The coupling part 22b extends forward relative to the plurality of friction plates 23 from a front end of the main body part 22a. Further, the outer rotary member 22 has a first cylindrical boss portion 22c extending forward from the main body part 22a and having a smaller outer diameter than that of the main body part 22a, and a second cylindrical boss portion 22d extending forward from the first boss portion 22c and having a smaller outer diameter than that of the first boss portion 22c.

The rear-wheel output shaft 12 forming the inner rotary member 21 is fitted to an inner circumferential surface of the first boss portion 22c, and the rear-wheel output shaft 12 is rotatably supported, at a front position, to the outer rotary member 22 via a coupling bearing 49. The coupling bearing 49 is provided between the inner circumferential surface of the first boss portion 22c and an outer circumferential surface of the rear-wheel output shaft 12, at a position between the inner and outer rotary members 21 and 22 of the coupling 20.

In this embodiment, as illustrated in FIG. 3, the rear end part 11c of the input shaft 11 is spline-fitted to the rear-wheel output shaft 12 by being inserted into the concave section 12h formed in the front end part 12g of the rear-wheel output shaft 12, and the fitted section of the input shaft 11 and the rear-wheel output shaft 12 overlap the coupling bearing 49 in the axial direction.

The rear end part 12i of the rear-wheel output shaft 12, as illustrated in FIG. 2, is spline-fitted to the coupling member 7 coupled to the rear-wheel propeller shaft, and rotatably supported by the transfer case 51 via a bearing 62 and the coupling member 7. The bearing 62 is provided between an inner circumferential surface of the transfer case 51 and an outer circumferential surface of the coupling member 7.

In the coupling part 22b provided to the outer rotary member 22 of the coupling 20, the second boss portion 22d is fitted to an outer circumferential side of the input shaft 11 and also fitted to an inner circumferential side of the drive gear 14, specifically an inner circumferential side of a rear extension part 14b (described later). The second boss portion 22d of the coupling part 22b is coupled, at a front side, to the drive gear 14 by being spline-fitted to an inner circumferential surface of the drive gear 14.

The drive gear 14 includes a front extension part 14a and the rear extension part 14b extending forward and rearward, respectively. A drive gear bearing 63 is provided between the front extension part 14a and the transfer case 51, and a drive gear bearing 64 is provided between the rear extension part 14b and the transfer case 51. The drive gear 14 is rotatably supported by the transfer case 51 via the drive gear bearings 63 and 64.

A torsional damper is used as the damper device 50 disposed between the coupling 20 and the drive gear 14, and as illustrated in FIG. 3, the damper device 50 includes an outer cylindrical member 41 forming an outer circumferential part of the damper device 50, an inner cylindrical member 42 forming an inner circumferential part of the damper device 50, and a cylindrical elastic member 43 provided between the outer and inner cylindrical members 41 and 42 to be coupled thereto.

The inner cylindrical member 42 of the damper device 50 is made of a metal material, disposed circumferentially outward of the first boss portion 22c of the coupling part 22b provided to the outer rotary member 22 of the coupling 20, and coupled to the coupling part 22b by being spline-fitted to an outer circumferential side of the first boss portion 22c.

The outer cylindrical member 41 of the damper device 50 is made of a metal material, and coupled to a cylindrical drive force transmission member 44 which is disposed circumferentially outward of the outer cylindrical member 41. A front part of the drive force transmission member 44 extends inward in radial directions thereof, and an inner end portion thereof extends forward and is coupled to an outer circumferential side of the rear extension part 14b of the drive gear 14.

The elastic member 43 is made of an elastic material (rubber, for example) and reduces the resonance frequency, at which the front-wheel drivetrain resonates with the torque variation of the engine 2, to be below the practical range of the engine 2.

In this embodiment, the inner cylindrical member 42 of the damper device 50 is coupled to the coupling part 22b provided to the coupling 20, and the outer cylindrical member 41 of the damper device 50 is coupled to the outer circumferential side of the rear extension part 14b of the drive gear 14. The damper device 50 is overlapped with the coupling bearing 49 in the axial directions.

Further, a gear backlash in the spline-fitted section, where the coupling part 22b provided to the coupling 20 is spline-fitted to the inner cylindrical member 42 of the damper device 50, is formed to be smaller than that in the spline-fitted section where the coupling part 22b provided to the coupling 20 is spline-fitted to the drive gear 14.

Thus, in a case where the front torque extracted by the coupling 20 is a predetermined value or below, the front torque is transmitted to the drive gear 14 from the coupling 20 via the damper device 50. Here, by torsion of the elastic member 43 of the damper device 50, the resonance frequency at which the front-wheel drivetrain resonates with the torque variation of the engine 2 is reduced to be below the practical range of the engine 2.

On the other hand, when the front torque extracted by the coupling 20 exceeds the predetermined value, the front torque is transmitted to the drive gear 14 from the coupling 20 via the damper device 50, and also via the spline-fitted section between the coupling part 22b provided to the coupling 20 and the drive gear 14.

Thus, the spline-fitted section between the coupling part 22b provided to the coupling 20 and the drive gear 14 functions as a stopper mechanism for limiting a relative rotation amount of the damper device 50, so as to prevent an excessive torque from being applied on the damper device 50.

The driven gear 15 meshed with the drive gear 14 is provided on the front-wheel output shaft 13 and includes a front extension part 15a and a rear extension part 15b extending forward and rearward, respectively. A driven gear bearing 65 is provided between the front extension part 15a and the transfer case 51, and a driven gear bearing 66 is provided between the rear extension part 15b and the transfer case 51. The driven gear 15 is rotatably supported by the transfer case 51 via the driven gear bearings 65 and 66.

The driven gear 15 is coupled to the front-wheel output shaft 13 by spline-fitting an inner circumferential surface of the rear extension part 15b to the front-wheel output shaft 13. The front-wheel output shaft 13 is coupled to the front-wheel propeller shaft 40 via the first universal joint 30, and an outer joint member 31 of the first universal joint 30 is integrally formed with a front part of the front-wheel output shaft 13.

The first universal joint 30 includes the outer joint member 31 integrally formed with the front-wheel output shaft 13, an inner joint member 32 coupled to the front-wheel propeller shaft 40, balls 33 interposed between the outer and inner joint members 31 and 32 and configured to transmit a drive force to the outer and inner joint members 31 and 32, and a cage 34 disposed between an inner circumferential surface of the outer joint member 31 and an outer circumferential surface of the inner joint member 32, the cage 34 being configured to hold the balls 33. Thereby, the drive force is transmitted between the front-wheel output shaft 13 and the front-wheel propeller shaft 40.

The transfer device 10 is further provided with a plurality of seal members 71, 72 and 73 in the transfer case 51, to prevent leakage of oil from the transfer case 51. The seal member 71 is disposed between the first case member 52 and the input shaft 11, and the seal member 72 is disposed between the first case member 52 and the front extension part 15a of the driven gear 15 provided on the front-wheel output shaft 13, and the seal member 73 is disposed between the third case member 54 and the coupling member 7 provided on the rear-wheel output shaft 12.

Additionally, a seal member 74 is disposed between the vertical wall 53a of the second case member 53 and the drive force transmission member 44 coupled to the rear extension part 14b of the drive gear 14. The seal member 74 is overlapped, in the axial directions, with the coupling part between the drive force transmission member 44 and the rear extension part 14b of the drive gear 14. Thus, compared to a case of providing a seal member at a forward position relative to the coupling part and between the second case member 53 and the rear extension part 14b of the drive gear 14, the transfer device 10 is shortened in an axial dimension and configured more compactly.

In the transfer device 10 having the above structure, the output torque of the engine 2 inputted into the input shaft 11 is transmitted to the rear-wheel output shaft 12. In the two-wheel drive state, the output torque is then outputted from the rear-wheel output shaft 12 to the rear wheels alone. In the four-wheel drive state, the output torque is outputted from the rear-wheel output shaft 12 to the rear wheels and also the front torque is extracted from the output torque by the coupling 20 and outputted to the front wheels.

When the front torque extracted by the coupling 20 is the predetermined value or below, the front torque is transmitted to the drive gear 14 from the coupling 20 via the damper device 50, and is further outputted to the front wheels from the drive gear 14 via the driven gear 15, the front-wheel output shaft 13, the front-wheel propeller shaft 40, and the front-wheel differential 60.

Here, the resonance frequency at which the front-wheel drivetrain resonates with the torque variation of the engine 2 is reduced to be below the practical range of the engine 2 by the damper device 50. Thus, the rattling sound of the teeth between the gears (between the drive gear 14 and the driven gear 15, for example), which may occur when the front torque extracted by the coupling 20 is comparatively low, is reduced.

As described above, in the transfer device 10 of this embodiment, the drive gear 14 is supported by the transfer case 51 via the drive gear bearings 63 and 64 provided between the front extension part 14a and the transfer case 51 and between the other-side extension part 14b and the transfer case 51, respectively. The coupling 20 is formed with the coupling part 22b coupled to the drive gear 14 by being fitted to the inner circumferential side of the other-side extension part 14b of the drive gear 14.

Thus, the coupling 20 is supported by the transfer case 51 via the drive gear bearing 64 provided between the transfer case 51 and the other-side extension part 14b of the drive gear 14 to which the coupling part 22b provided to the coupling 20 is fitted. Therefore, the axial dimension of the transfer device 10 is shortened compared to a case where a bearing for supporting the coupling 20 to the transfer case 51 is provided on the other side of the drive gear bearing 64 in the axial directions (front side in this embodiment). As a result, the transfer device 10 is structured compactly.

Further, the damper device 50 is provided between the coupling 20 and the drive gear 14. In the damper device 50, the inner cylindrical member 42 is coupled to the coupling part 22b, and the outer cylindrical member 41 is coupled to the outer circumferential side of the other-side extension part 14b of the drive gear 14. Thus, the damper device 50 is sandwiched between the parts 22b and 44 coupled to the inner circumferential side and the outer circumferential side of the other-side extension part 14b, respectively. As a result, the transfer device 10 is structured compactly.

Further, coupling the coupling 20 and the drive gear 14 to each other via the damper device 50 can achieve the potential advantage of reducing the rattling sound of the teeth between the gears (between the drive gear 14 and the driven gear 15, for example), which occurs by the resonance of the drive train with the variation of the output torque of the drive source, the resonance of the drivetrain reaching the auxiliary drive wheels via the coupling 20, the drive gear 14, and the driven gear 15.

Therefore, the rattling sound of the teeth between the gears is reduced in the transfer device 10 mounted on the four-wheel drive vehicle 1, while compactly configuring the transfer device 10.

Further, the coupling 20 includes the inner rotary member 21 coupled to the input shaft 11, the outer rotary member 22 coupled to the damper device 50, and the coupling bearing 49 provided on the one side of the friction plates 23 in the axial direction, at a position between the inner and outer rotary members 21 and 22. Moreover, the damper device 50 overlaps the coupling bearing 49 in the axial direction. Thus, compared to a case where the damper device 50 is disposed in line with the coupling bearing 49 in the axial direction, the axial dimension of the transfer device 10 is shortened. As a result, the transfer device 10 is configured compactly.

Further, the axially-other-side end part 11c of the input shaft 11 is fitted to the rear-wheel output shaft 12 by being inserted into the concave section 12h formed in the axially-one-side end part 12g of the main-wheel output shaft 12. Moreover, the fitted section of the input shaft 11 and the main-wheel output shaft 12 overlap the coupling bearing 49 in the axial direction. Thus, since the fitted section of the input shaft 11 and the main-wheel output shaft 12 are supported by the outer rotary member 22 of the coupling 20 via the coupling bearing 49, the fitted section is stably supported by the transfer case 51 via the coupling bearing 49 and the drive gear bearing 64.

Second Embodiment

First, a transfer structure of a vehicle according to a second embodiment is described with reference to FIGS. 4 to 6.

Figure 4:
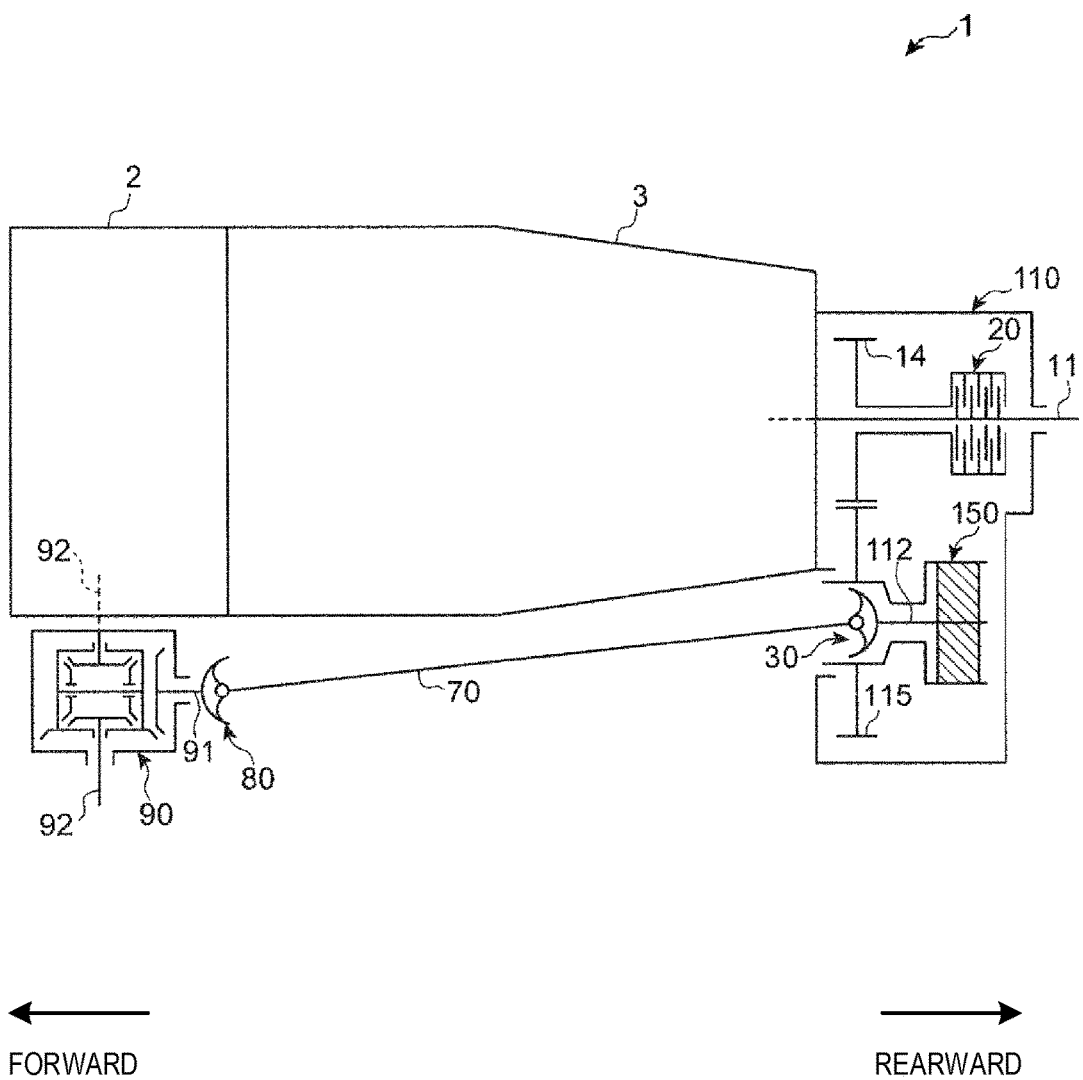
FIG. 4 is a schematic view illustrating a drive force transmission mechanism of a vehicle according to a second embodiment of the present invention.

As illustrated in FIG. 4, the vehicle of this embodiment is a four-wheel drive vehicle of a front-engine, rear-wheel drive base, and a power unit comprised of an engine 2 and a transmission 3 is vertically arranged in an engine room in a front part of the vehicle. The power unit changes a drive force of the engine 2 by the transmission 3. A transfer device 110 for distributing a torque outputted by the power unit to rear wheels (main drive wheels) as well as front wheels (auxiliary drive wheels) is provided on a rear side of the transmission 3 in front-and-rear directions of the vehicle.

The transfer device 110 includes a transfer input shaft 11 (hereinafter, simply referred to as the "input shaft 11") and a transfer output shaft 112 (hereinafter, simply referred to as the "output shaft 112") which extend in the front-and-rear directions of the vehicle and are arranged in parallel to each other. In other words, axial directions of the transfer input shaft 11 and the transfer output shaft 112 correspond to the front-and-rear directions of the vehicle. The input shaft 11 is communicated, at one end, with an output shaft of the transmission 3, extends to an opposite side from the engine (counter-engine side), and is communicated, at the other end, with the rear wheels. The output shaft 112 is communicated with the front wheels. A drive gear 14 is provided on the input shaft 11, and a driven gear 115 meshed with the drive gear 14 is provided on the output shaft 112. Thus, a torque is transmitted from the input shaft 11 to the output shaft 112 by a gear train including the drive gear 14 and the driven gear 115.

Further, the transfer device 110 is a transfer device capable of automatic intermittent operation referred to as a torque split type using an electromagnetic clutch. A variable volume coupling mechanism 20 (hereinafter, simply referred to as the "coupling mechanism 20") capable of varying a ratio of the torques to be transmitted to the rear wheels and the front wheels within a range between 50:50 and 100:0 (rear wheels : front wheels) is provided on the input shaft 11.

Moreover, a damper device 150 for shifting, to a range outside of a practical range of the engine 2, a frequency of resonance which occurs in the engine 2, is provided on the output shaft 112. In this embodiment, the damper device 150 is provided on the output shaft 112 rearward relative to the driven gear 115, in other words, on the counter-engine side of a first universal joint 30 (described later).

Furthermore, a front end part of the output shaft 112 is provided with the first universal joint 30, and is coupled to a rear end part of a front propeller shaft 70 (hereinafter, simply referred to as the "propeller shaft 70"). The first universal joint 30 is disposed inward relative to the driven gear 115 in radial directions thereof.

A front end part of the propeller shaft 70 is provided with a second universal joint 80, and is coupled to an input shaft 91 of a front differential gear 90 via the second universal joint 80. The front differential gear 90 distributes the torque from the input shaft 91 to left and right output shafts 92, so as to rotate the left and right front wheels. The propeller shaft 70 is arranged to incline with respect to the front-and-rear directions, along a rear part of a transmission case of the transmission 3 of which diameter becomes smaller toward the vehicle rear.

Figure 5:
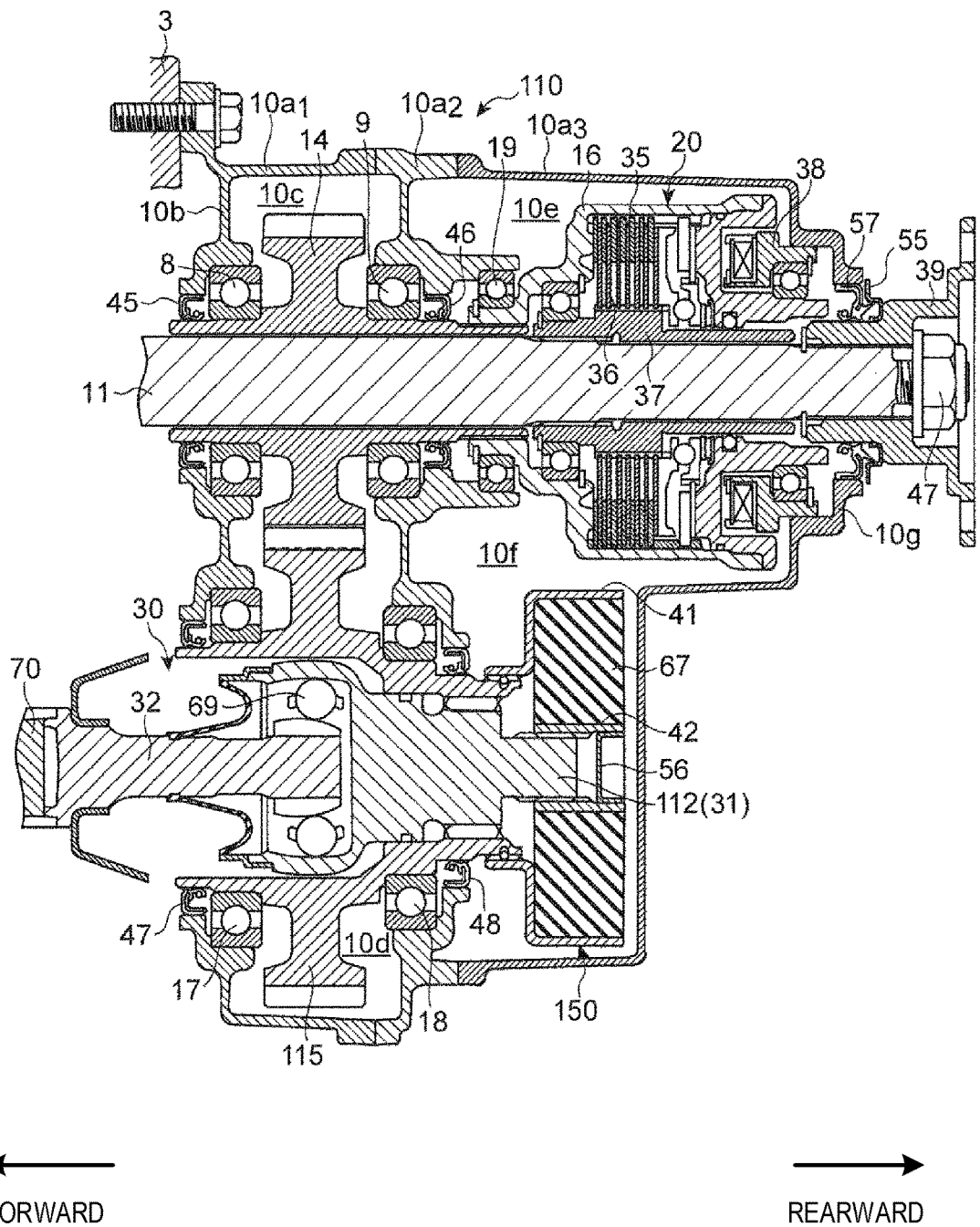
FIG. 5 is a cross-sectional view illustrating a transfer structure of FIG. 4.

Next, a structure of the transfer device 110 is described more into detail with reference to FIG. 5.

[Transfer Device]

As illustrated in FIG. 5, the transfer device 110 is accommodated inside a transfer case 10a. In this embodiment, the transfer case 10a has a tripartite structure in which a first case member 10a1, a second case member 10a2, and a third case member 10a3 are arranged in this order from the front side of the vehicle and coupled to each other to be oil tight. A front part of the transfer case 10a has a front wall 10b, and the front wall 10b is attached to the transmission 3 via a bolt to be detachable.

Inside the transfer case 10a, the input shaft 11 is rotatably accommodated on one end side (upper side of FIG. 5) and the output shaft 112 is rotatably accommodated on the other side (lower side of FIG. 5).

Further, the transfer case 10a has an accommodation space 10c and an accommodation space 10d on the one end side and the other end side, surrounded by the first and second case members 10a1 and 10a2, respectively. The transfer case 10a also has an accommodation space 10e and an accommodation space 10f on the one end side and the other end side, surrounded by the second and third case members 10a2 and 10a3, respectively.

The accommodation space 10c accommodates the drive gear 14 provided on the input shaft 11, and the accommodation space 10d accommodates the driven gear 115 provided on the output shaft 112. Further, the accommodation space 10e accommodates the coupling mechanism 20 provided on the input shaft 11, and the accommodation space 10f accommodates the damper device 150 provided on the output shaft 112.

The drive gear 14 has cylindrical supporting parts on the front and rear sides thereof, and the supporting parts are rotatably supported by the front part of the transfer case 10a via bearings 8 and 9 provided on the front and rear sides of the drive gear 14 (positions overlapping with the supporting parts in the axial directions thereof, respectively). Similarly, the driven gear 115 has cylindrical supporting parts on the front and rear sides thereof, and the supporting parts are rotatably supported by the front part of the transfer case 10a via bearings 17 and 18. The drive gear 14 and the driven gear 115 are meshed in a section where the accommodation spaces 10c and 10d meet (meshing section).

[Coupling Mechanism]

The coupling mechanism 20 includes a housing 16, a plurality of outer clutch plates 35 disposed inside the housing 16 and for integrally rotating with the housing 16, a hollow shaft part 37 disposed inside the housing 16 and spline-fitted to the input shaft 11 to integrally rotate with the input shaft 11, a plurality of inner clutch plates 36 for integrally rotating with the hollow shaft part 37 and capable of frictionally engaging with the outer clutch plates 35, and a magnetic force generator 38 for generating a magnetic force to frictionally engage the clutch plates 35 and 36 with each other.

In the coupling mechanism 20, a front part of the housing 16 for integrally rotating with the outer clutch plates 35 is rotatably supported by the second case member 10a2 of the transfer case 10a via a bearing 19, and the magnetic force generator 38 is fixed to the third case member 10a3. An inner circumferential surface of the front part of the housing 16 is spline-fitted to an outer circumferential surface of a rear end part of the drive gear 14. Further, an inner circumferential surface of the hollow shaft part 37 for integrally rotating with the inner clutch plates 36 is spline-fitted to an outer circumferential surface of the input shaft 11.

Thus, in a state where power is not distributed to a coil of the magnetic force generator 38, the clutch plates 35 and 36 are in a disengaged state where the drive force is not transmitted between the input shaft 11 and the drive gear 14 via the coupling mechanism 20. Therefore, in the disengaged state, only the left and right rear wheels are driven and the front wheels are not driven. When the power is distributed to the coil of the magnetic force generator 38 from this state, the clutch plates 35 and 36 are frictionally engaged with each other, and the drive force is transmitted between the input shaft 11 and the drive gear 14 via the coupling mechanism 20 according to an engaging torque in proportion to the coil current. Thus, the front wheels are driven by the drive force and the vehicle enters a four-wheel drive state.

A rear end part of the input shaft 11 is inserted through a rear wall part 10g of the third case member 10a3 of the transfer case 10a to protrude outside of the transfer case 10a. A coupling part 39 coupled to a rear propeller shaft (not illustrated) is spline-fitted to an outer circumferential surface of the protruding rear end part, and the coupling part 39 is fixed to the protruding rear part in the axial directions by fastening a nut 47 to a thread part protruding from the protruding rear end part. Further, a labyrinth seal 55 is fitted to an outer circumferential surface of the coupling part 39.

In the accommodation spaces 10c and 10d, oil for lubricating the meshing section of the drive gear 14 and driven gear 115, the bearings 8, 9, 17 and 18, for example, is enclosed by oil seals 45, 46, and 48. The oil includes a component for preventing galling of the drive gear 14 and driven gear 115 in the meshing section. Further, the accommodation spaces 10e and 10f are kept oil-tight from the outside of the transfer case 10a and the accommodation spaces 10c and 10d adjacent to the accommodation spaces 10e and 10f, by an oil seal 57, the oil seal 46, and the labyrinth seal 55.

Figure 6:
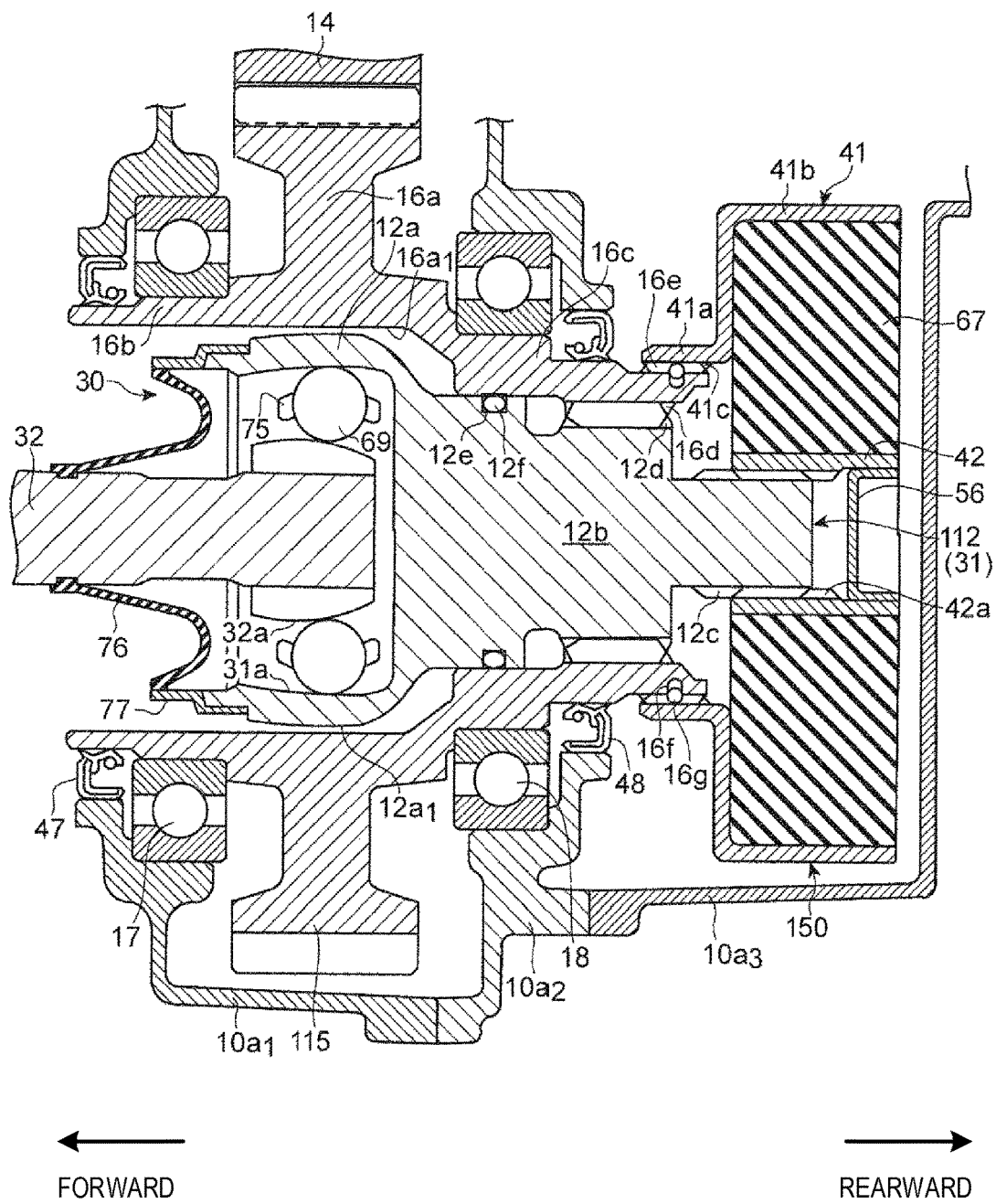
FIG. 6 is an enlarged cross-sectional view of a damper device provided on a driven gear of FIG. 5.

Next, structures of respective components on the output shaft 112 are described further in detail with reference to FIG. 6.

[Driven Gear]

As illustrated in FIG. 6, the driven gear 115 has a gear main part 16a formed with inclined teeth in an outer circumferential surface thereof, a front cylindrical part 16b integrally formed with the gear main part 16a and extending forward therefrom, and a rear cylindrical part 16c integrally formed with the gear main part 16a and extending rearward therefrom. The front and rear cylindrical parts 16b and 16c are supported by the transfer case 10a via the bearings 17 and 18. In this embodiment, inner circumferential surfaces of the gear main part 16a and the front cylindrical part 16b have substantially the same diameter as each other, and an inner circumferential surface of the rear cylindrical part 16c has a smaller diameter than those of the gear main part 16a and the front cylindrical part 16b. A spline 16d is formed in the inner circumferential surface of a rear portion of the rear cylindrical part 16c, and a spline 16e is formed in an outer circumferential surface of the rear portion of the rear cylindrical part 16c, at a position rearward relative to a portion with which a lip of the oil seal 48 slidably contacts. The spline 16e is spline-fitted to a spline 41c of an outer cylindrical member 41 of the damper device 150 (described later). Further, a circumferential groove 16f to which a stopper ring 16g is attached is formed substantially at an axially center position relative to the portion of the outer circumferential surface where the spline 16e is formed. By attaching the stopper ring 16g into the circumferential groove 16f, the outer cylindrical member 41 of the damper device 150 spline-fitted thereto is fixed to the driven gear 115 in the axial directions of the transfer device 110. Note that, the reference character "16a1" in FIG. 6 indicates the entire inner circumferential surface of the driven gear 115, including the parts 16a to 16c.

[Universal Joint]

The first universal joint 30 is a so-called Rzeppa constant velocity joint, and includes an outer joint member 31, an inner joint member 32, and a plurality of torque transmission balls 69 (hereinafter, simply referred to as the "balls 69") for transmitting the torque between the joint members 31 and 32.

Here, the output shaft 112 is also used as the outer joint member 31 of the first universal joint 30, in other words, as illustrated in FIG. 6, the output shaft 112 includes a fitting part 12a on the front side and a shaft part 12b on the rear side. The outer joint member 31 of the first universal joint 30 is formed by the fitting part 12a of the output shaft 112. Further, the outer joint member 31 has a spherical inner circumferential surface 31a.

On the other hand, the inner joint member 32 is a shaft-like member. A front end part of the inner joint member 32 is coupled to a rear end part of the propeller shaft 70 arranged coaxially therewith, and a rear end part of the inner joint member 32 has a spherical outer circumferential surface 32a. Each of the spherical inner and outer circumferential surfaces 31a and 32a of the inner and outer joint members 31 and 32, respectively, is formed with a plurality of track grooves so that the track grooves of the spherical inner circumferential surface 31a face the track grooves of the spherical outer circumferential surface 32a. Each ball 69 is interposed between the track grooves of the outer and inner joint members 31 and 32.

Further, a retainer 75 having a plurality of window portions arranged in a circumferential direction of the retainer 75 and for accommodating the balls 69 is provided between the spherical inner and outer circumferential surfaces 31a and 32a of the inner and outer joint members 31 and 32. The balls 69 are held between the spherical inner and outer circumferential surfaces 31a and 32a of the inner and outer joint members 31 and 32 by the retainer 75.

Moreover, to seal the first universal joint 30 enclosing a lubricant (grease, for example) at an outside thereof, a boot 76 formed by an elastic member and a boot band 77 integrally coupled to the boot 76 are provided between outer circumferential surfaces of the outer and inner joint members 31 and 32. A front circumferential edge part of the boot 76 is fixed to the outer circumferential surface of the inner joint member 32, and a rear circumferential edge part of the boot 76 is fixed to the outer circumferential surface of the outer joint member 31 via the boot band 77.

The shaft part 12b of the output shaft 112 has a stepped shaft shape of which diameter becomes smaller toward the vehicle rear, and an outer circumferential surface of a large-diameter portion (front portion) of the shaft part 12b is formed with a circumferential groove 12e, and an O-ring 12f is fitted to the circumferential groove 12e. The outer circumferential surface of the shaft part 12b and the inner circumferential surface of the rear cylindrical part 16c of the driven gear 115 are sealed therebetween by the O-ring 12f.

Further, a spline 12d is formed in an outer circumferential surface of a medium-diameter portion having a smaller diameter than the large-diameter portion, which is on the rear side of the circumferential groove 12e as described above. The spline 12d is spine-fitted to the spline 16d formed in the inner circumferential surface of the rear cylindrical part 16c of the driven gear 115.

Moreover, a spline 12c is formed in an outer circumferential surface of a small-diameter portion having an even smaller diameter than the medium-diameter portion, which is on the rear side of the spline 12d as described above. The spline 12c is spline-fitted to a spline 42a formed in an inner circumferential surface of an inner cylindrical member 42 of the damper device 150 (described later).

Here, a fitting gap in the spline-fitted section of the output shaft 112 and the damper device 150 in the circumferential direction thereof (namely, a clearance between a tooth of the spline 12c and a tooth of the spline 42a adjacent thereto) is smaller than a fitting gap in the spline-fitted section of the output shaft 112 and the driven gear 115 in the circumferential direction thereof (i.e., a clearance between a tooth of the spline 12d and a tooth of the spline 16d adjacent thereto). Note that, the reference character "12a1" in FIG. 6 indicates the entire outer circumferential surface of the output shaft 12, including the parts 12a and 12b.

[Damper Device]

The damper device 150 includes the outer cylindrical member 41 located on the front side, the inner cylindrical member 42 located radially inward of the outer cylindrical member 41, and an elastic member 67 provided between the inner cylindrical member 42 and outer cylindrical member 41. The elastic member 67 is configured to allow both of the members 41 and 42 to rotate relative to each other.

The outer cylindrical member 41 has a communicating part 41a communicating with the driven gear 115, and a supporting part 41b formed continuously from the communicating part 41a. The supporting part 41b has a larger diameter than the communicating part 41a, and configured to support the elastic member 67. An inner circumferential surface of the communicating part 41a is formed with the spline 41c, and the spline 41c is spline-fitted to the spline 16e formed in the outer circumferential surface of the rear cylindrical part 16c of the driven gear 115.

The inner cylindrical member 42 is a tubular member coupled to the output shaft 112 and is formed with the spline 42a in the inner circumferential surface of a front part thereof The spline 42a is spline-fitted to the spline 12c formed in the outer circumferential surface of the small-diameter portion of the shaft part 12b of the output shaft 112. Further, a cap member 56 is fitted to a rear end opening of the inner cylindrical member 42.

The elastic member 67 is a ring-shaped member formed to fill space between an inner circumferential surface of the supporting part 41b of the outer cylindrical member 41 and an outer circumferential surface of the inner cylindrical member 42. Further, the elastic member 67 is a single body formed by an elastic member (e.g., rubber) having a predetermined elasticity and stiffness at which the effect of shifting the resonance frequency to the outside of the practical range is obtained. The outer cylindrical member 41, the inner cylindrical member 42, and the elastic member 67 are coaxially arranged with each other and integrally coupled to each other.

In this embodiment, the damper device 150 is located on the rear side of the bearing 18, at a position overlapping with the coupling mechanism 20 in the front-and-rear directions. The bearing 18 supports the driven gear 115 at the rear side thereof.

Therefore, in a case where the torque transmitted to the front wheel side (torque transmitted from the driven gear 115 to the output shaft 112, may be referred to as the "front torque" below) is a predetermined value or below, the front torque can be transmitted to the output shaft 112 from the driven gear 115 via the damper device 150. By torsion of an inner circumferential part of the elastic member 67 of the damper device 150 with respect to an outer circumferential part thereof, the inner cylindrical member 42 connected with the outer cylindrical member 41 via the elastic member 67 slightly rotates centering on a center axis of the damper device 150. With such a damper function of the damper device 150, for example, a frequency of resonance which occurs in the engine 2, the meshing section of the drive gear 14 and the driven gear 115, for example, in the torsional direction, can be shifted to the outside of the practical range.

On the other hand, when the front torque exceeds the predetermined value, the fitting gap in the spline-fitted section of the driven gear 115 is closed, and the torque can directly be transmitted to the output shaft 112 from the driven gear 115 without transmitting through the damper device 150. Therefore, this spline-fitted section where the fitting gap is large has a stopper function for limiting the relative rotational amount of the damper device 150, and a high torque generated by the engine 2 is surely transmitted to the front wheels while preventing an excessive torque from being applied on the damper device 150.

It will be noted that a dynamic damper or a centrifugal pendulum damper may be applied as the damper device 150. Further, a spring may alternatively be used as the elastic member 67 of the damper device 150.

Third Embodiment

Figure 7:
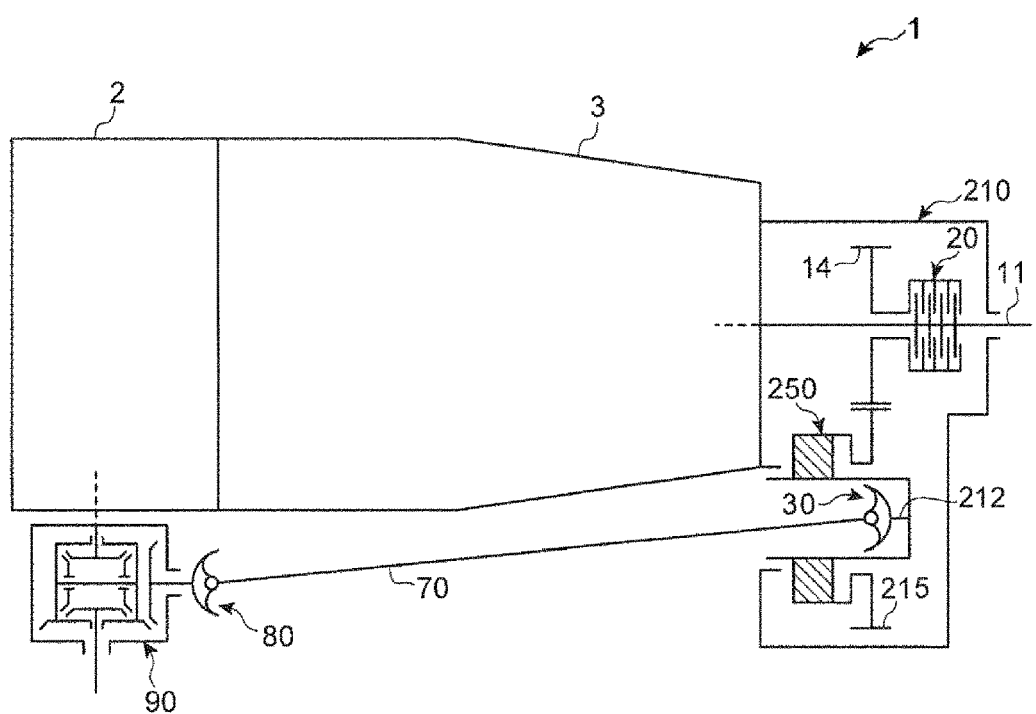
FIG. 7 is a schematic plan view illustrating a drive force transmission mechanism of a vehicle according to a third embodiment of the present invention.

Next, a transfer device 210 of a vehicle according to a third embodiment is described with reference to FIG. 7. Note that, in the third embodiment, common configurations to the second embodiment are denoted with the same reference characters in the drawing and description thereof is omitted.

The transfer device 210 of the third embodiment is different from the transfer device 110 of the second embodiment in the position of the damper device. Specifically, the transfer device 210 is provided with a damper device 250 only on the engine side of the first universal joint 30. The damper device 250 is disposed at an axially offset position relative to a driven gear 215 where the first universal joint 30 is disposed inward thereof in radial directions of the driven gear 215.

The damper device 250 has an outer cylindrical member of which a rear part is reduced in diameter and coupled to the driven gear 215, and an inner cylindrical member extending through the driven gear 215 to the rear side and coupled to an output shaft 212 at a position rearward of the first universal joint 30.

Therefore, a torque transmitted to the driven gear 215 is transmitted to the output shaft 212 via the damper device 250. It will be note that, by providing a spline-fitted section between an inner circumferential surface of the driven gear 215 and an outer circumferential surface of the inner cylindrical member of the damper device 250, so as to have a comparatively large fitting gap therebetween, similarly to the second embodiment, the spline-fitted section can function as a stopper mechanism.

Fourth Embodiment

Figure 8:
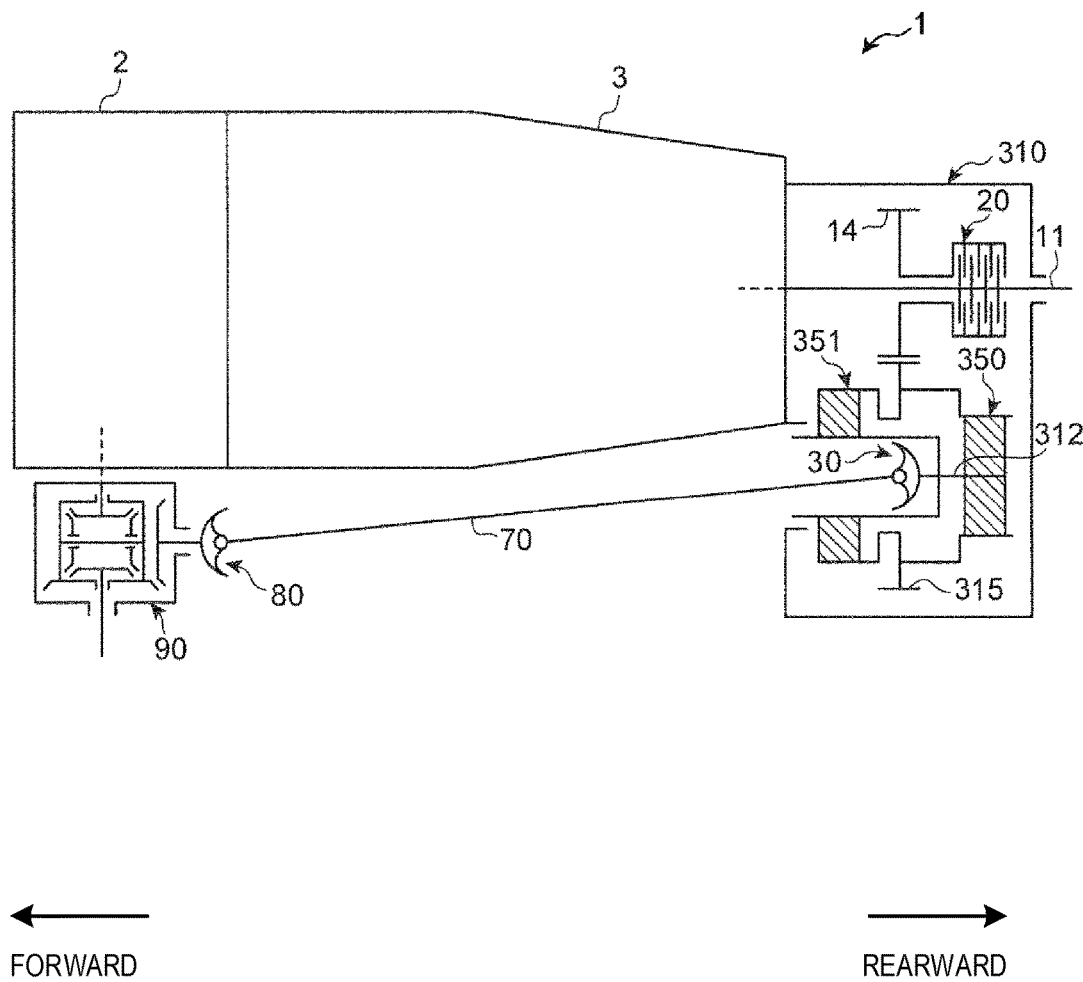
FIG. 8 is a schematic plan view illustrating a drive force transmission mechanism of a vehicle according to a fourth embodiment of the present invention.

Next, a transfer device 310 of a vehicle according to a fourth embodiment is described with reference to FIG. 8. Note that, in the fourth embodiment, common configurations to the second embodiment are denoted with the same reference characters in the drawing and description thereof is omitted.

The transfer device 310 of the fourth embodiment is different from the transfer devices 110 and 210 of the second and third embodiments described above, in the position of the damper device and the number thereof Specifically, the transfer device 310 is provided with a damper device 350 on the counter-engine side of the first universal joint 30, and also a damper device 351 on the engine side of the first universal joint 30. The damper devices 350 and 351 are disposed at axially offset positions relative to a driven gear 315 where the first universal joint 30 is disposed inward thereof in radial directions of the driven gear 315.

The damper device 350 has an outer cylindrical member of which a front part is coupled to the driven gear 315, and an inner cylindrical member coupled to a rear end part of an output shaft 312. The damper device 351 has an outer cylindrical member of which a rear part is reduced in diameter and coupled to the driven gear 315, and an inner cylindrical member extending through the driven gear 315 to the rear side and coupled to the output shaft 312 at a position rearward relative to the first universal joint 30 and forward relative to the damper device 350.

Therefore, a torque transmitted to the driven gear 315 is transmitted to the output shaft 312 via the damper devices 350 and 351. Note that, by providing a spline-fitted section between an inner circumferential surface of the driven gear 315 and an outer circumferential surface of the outer cylindrical member of the damper device 351, for example, so as to have a comparatively large fitting gap therebetween, similarly to the second embodiment, the spline-fitted section can function as a stopper mechanism.

As described above, according to these embodiments, the damper devices 150, 250, 350 and 351 are provided on the transfer output shafts 112, 212 and 312, on at least one of the sides of the first universal joint 30 in the axial directions. Thus, the damper devices 150, 250, 350 and 351 are disposed at axially offset positions from the driven gears 115, 215 and 315 where the first universal joint 30 is disposed radially inward relative to the driven gears 115, 215 and 315. Therefore, an increase of radial dimensions of the driven gears 115, 215 and 315 is suppressed, and the damper devices 150, 250, 350 and 351 are capable of suppressing an increase of a torque variation, for example, so that they can sufficiently reduce the rattling sound of the teeth of the gears without degrading vehicle mountability.

Further, according to the second embodiment, the drive gear 14 is disposed on the counter-engine side of the transmission 3, the damper device 150 is disposed only on the counter-engine side of the first universal joint 30, which is disposed radially inward relative to the driven gear 115 communicating with the drive gear 14, and the transmission 3 and the damper device 150 are disposed to be separated from each other in the axial directions. Thus, interference between the transmission 3 and the damper device 150 is prevented.

Further, according to the second embodiment, the engine-side bearing 17 and the counter-engine-side bearing 18 for supporting the driven gear 115 to the transfer case 10a are disposed on the engine side and the counter-engine side of the first universal joint 30, respectively. The damper device 150 is disposed on the counter-engine side of the counter-engine-side bearing 18, in other words, the damper device 150 is not disposed between the engine-side bearing 17 and the counter-engine-side bearing 18 which support the driven gear 115. Therefore, an extension of the support span of the driven gear 115 is suppressed.

Further, according to the second and fourth embodiments, the damper devices 150 and 350 overlap the coupling mechanism 20 provided on the transfer input shaft 11, in the axial directions of the transfer input shaft 11. Therefore, compared to a case where they are not overlapped, the transfer device 110 can be structured more compactly in the axial directions of the transfer input shaft 11.

Further, according to the second to fourth embodiments, the above-described effects are achieved by the damper devices 150, 250, 350 and 351, each including the outer cylindrical member 41, the inner cylindrical member 42, and the elastic member 67 for allowing the relative rotation of both members 41 and 42.

Further, according to the second embodiment, in the outer cylindrical member 41 of the damper device 150, since the part supporting the elastic member 67 has a larger diameter than the part communicating with the driven gear 115, the large elastic member 67 is provided to the damper device 150. Thus, good damper performance is ensured.

Further, according to the second embodiment, the inner circumferential surface 16a1 of the driven gear 115 and the outer circumferential surface 12a1 of the transfer output shaft 112 are coupled to each other by the splines 12d and 16d so as to be able to rotate relative to each other in the predetermined manner described above. The splines 12d and 16b constitute a stopper mechanism for limiting the relative rotation amount of the damper device 150. This ensures that the relative rotation of the damper device 150 does not become larger than the maximum relative rotation amount that is allowed by the stopper mechanism. As a result, the damper device 150 is prevented from becoming damaged.

Moreover, according to the second to fourth embodiments, the transfer output shafts 112, 212 and 312 are also used as the outer joint member 31 of the first universal joint 30. Therefore, the number of components in the transfer devices 110, 210 and 310 is reduced to enable more compact configurations.

The present invention is not limited to the above illustrative embodiments, and various enhancements and various modifications in design can be made without departing from the scope of the present invention.

For example, in the first embodiment, the transfer device 110 for transmitting the drive force of the engine 2 to the drive wheels by using, as the drive member and the driven member, the drive gear 14 and the driven gear 115 that are engaged with each other, is described. However, without being limiting to this configuration, the present invention may alternatively be applied to a transfer device for transmitting a drive force by using a drive sprocket and a driven sprocket communicated with each other via a chain.

The present invention is not limited to the above illustrative embodiments, and various enhancements and various modifications in design can be made without departing from the scope of the present invention.

As described above, according to the present invention, the rattling sound of the teeth between the gears can be reduced in a transfer device which is mounted on a four-wheel drive vehicle, while configuring it compactly. Further, good damper performance can be ensured in a transfer device of a vehicle, while suppressing an increase of a torque variation, for example without degrading vehicle mountability. Therefore, the present invention may suitably be used in the fields of manufacturing industries of this type of four-wheel drive vehicle, and other vehicles on which transfer devices are mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. A transfer device of a vehicle, comprising:
an input shaft configured to receive an output torque of a drive source at an axial first side of the input shaft in axial directions thereof;
a main-wheel output part provided on an axial second side of the input shaft and configured to output the output torque of the drive source to main drive wheels, the axial second side being opposite from the axial first side in the axial directions;
an auxiliary-wheel output shaft provided in parallel to the input shaft and configured to output the output torque of the drive source to auxiliary drive wheels;
a coupling provided on the input shaft and configured to extract a part of the output torque that is outputted to the auxiliary drive wheels;
a drive member having a hollow section and provided on the input shaft;
a driven member provided on the auxiliary-wheel output shaft and meshed with the drive member;
a universal joint provided on the auxiliary-wheel output shaft; and
a damper device provided on one of the input shaft and the auxiliary-wheel output shaft and configured to reduce noise that occurs due to a variation of the output torque of the drive source,
wherein when the damper device is provided on the input shaft,
the drive member includes a first-side extension part and a second-side extension part extending to the axial first side and the axial second side in axial directions, respectively,
the drive member is supported to a transfer case via a drive member bearing provided between the first-side extension part and the transfer case, and another drive member bearing provided between the second-side extension part and the transfer case,
a coupling part fitted to an inner circumferential side of the second-side extension part of the drive member and coupled to the drive member, the coupling part being provided to the coupling,
the damper device is disposed between the coupling and the drive member, and an inner circumferential part of the damper device is coupled to the coupling part and an outer circumferential part of the damper device is coupled to an outer circumferential side of the second-side extension part of the drive member, and wherein when the damper device is provided on the auxiliary-wheel output shaft, the damper device is disposed at least on one of axial first side and axial second side of the universal joint in the axial directions of the auxiliary-wheel output shaft.

2. A transfer device of a vehicle, comprising:

an input shaft configured to receive an output torque of a drive source at an axial first side of the input shaft in axial directions thereof;

a main-wheel output part provided on an axial second side of the input shaft and configured to output the output torque of the drive source to main drive wheels, the axial second side being opposite from the axial first side in the axial directions;

an auxiliary-wheel output shaft provided in parallel to the input shaft and configured to output the output torque of the drive source to auxiliary drive wheels;

a coupling provided on the input shaft and configured to extract a part of the output torque that is outputted to the auxiliary drive wheels;

a drive member having a hollow section and provided on the input shaft; and a driven member provided on the auxiliary-wheel output shaft and meshed with the drive member, wherein the drive member includes a first-side extension part and a second-side extension part extending to the axial first side and the axial second side in axial directions, respectively, wherein the drive member is supported to a transfer case via a drive member bearing provided between the first-side extension part and the transfer case, and another drive member bearing provided between the second-side extension part and the transfer case, wherein a coupling part is fitted to an inner circumferential side of the second-side extension part of the drive member and coupled to the drive member, the coupling part being provided to the coupling, wherein a damper device is disposed between the coupling and the drive member, and wherein an inner circumferential part of the damper device is coupled to the coupling part and an outer circumferential part of the damper device is coupled to an outer circumferential side of the second-side extension part of the drive member.

3. The transfer device of claim 2, wherein the coupling includes:

an inner rotary member coupled to the input shaft;
an outer rotary member coupled to the damper device;
friction plates disposed between the inner and outer rotary members; and
a coupling bearing provided on an axial first side of the friction plates, between the inner and outer rotary members, and
wherein the damper device and the coupling bearing overlap each other in the axial directions.

4. The transfer device of claim 3, wherein the main-wheel output part is a main-wheel output shaft coaxially coupled to the input shaft and configured to output the output torque of the drive source to the main drive wheels, wherein a second-side axial end part of the input shaft on the axial second side of the input shaft is fitted to the main-wheel output shaft by being inserted into a concave section formed in a first-side axial end part of the main-wheel output shaft, and wherein the fitted section of the input shaft and the main-wheel output shaft overlap the coupling bearing in the axial directions.

5. A transfer device of a vehicle, comprising:

an input shaft configured to receive an output torque of a drive source at an axial first side of the input shaft in axial directions thereof;

a main-wheel output part provided on an axial second side of the input shaft and configured to output the output torque of the drive source to main drive wheels, the axial second side being opposite from the axial first side in the axial directions;

an auxiliary-wheel output shaft provided in parallel to the input shaft and configured to output the output torque of the drive source to auxiliary drive wheels;

a coupling provided on the input shaft and configured to extract a part of the output torque that is outputted to the auxiliary drive wheels;

a drive member having a hollow section and provided on the input shaft;

a driven member provided on the auxiliary-wheel output shaft and meshed with the drive member;

a universal joint provided on the auxiliary-wheel output shaft, the universal joint having an axial first side and an axial second side; and a damper device disposed at least on one of the axial first side and axial second side of the universal joint, and configured to reduce noise that occurs due to a variation of the output torque of the drive source.

6. The transfer device of claim 5, wherein a transmission is attached to the axial first side of the transfer device, and wherein the damper device is disposed on the axial second side of the universal joint.

7. The transfer device of claim 6, wherein a first-side bearing and a second-side bearing configured to support the driven member to a transfer case are disposed on the axial first side and axial second side of the universal joint, respectively, wherein the first-side bearing and the second-side bearing each have an axial first side and an axial second side, and wherein the damper device is disposed on the axial second side of the second-side bearing.

8. The transfer device of claim 7, further comprising a coupling provided on the input shaft, wherein the damper device overlaps the coupling in the axial directions of the input shaft.

9. The transfer device of claim 8, wherein the damper device includes:

an outer cylindrical member configured to communicate with the driven member;
an inner cylindrical member coupled to the auxiliary-wheel output shaft; and
an elastic member provided between the outer and inner cylindrical members and configured with a tolerance, the outer and inner cylindrical members rotating in relation to each other within the tolerance.

10. The transfer device of claim 9, wherein a part of the outer cylindrical member supporting the elastic member has a larger diameter than a part of the outer cylindrical member communicating with the driven member.

11. The transfer device of claim 10, wherein an inner circumferential surface of the driven member and an outer circumferential surface of the auxiliary-wheel output shaft are coupled to each other via a coupled section so as to rotate in relation to each other, and wherein a stopper mechanism, configured to limit a relative rotation amount of the damper device, is provided in the coupled section.

12. The transfer device of claim 11, wherein the auxiliary-wheel output shaft also functions as an outer joint member of the universal joint.

13. The transfer device of claim 6, wherein the damper device includes:

an outer cylindrical member configured to communicate with the driven member;

an inner cylindrical member coupled to the auxiliary-wheel output shaft; and an elastic member provided between the outer and inner cylindrical members and configured with a tolerance, the outer and inner cylindrical members rotating in relation to each other within the tolerance.

14. The transfer device of claim 13, wherein an inner circumferential surface of the driven member and an outer circumferential surface of the auxiliary-wheel output shaft are coupled to each other via a coupled section so as to rotate in relation to each other, and wherein a stopper mechanism configured to limit a relative rotation amount of the damper device is provided in the coupled section.

15. The transfer device of claim 14, wherein the auxiliary-wheel output shaft also functions as an outer joint member of the universal joint.

16. The transfer device of claim 5, wherein the damper device overlaps the coupling in the axial directions of the input shaft.

17. The transfer device of claim 16, wherein the damper device includes:

an outer cylindrical member configured to communicate with the driven member;

an inner cylindrical member coupled to the auxiliary-wheel output shaft; and an elastic member provided between the outer and inner cylindrical members and configured with a tolerance, the outer and inner cylindrical members rotating in relation to each other within the tolerance.

18. The transfer device of claim 17, wherein a part of the outer cylindrical member supporting the elastic member has a larger diameter than a part of the outer cylindrical member communicating with the driven member.

19. The transfer device of claim 18, wherein an inner circumferential surface of the driven member and an outer circumferential surface of the auxiliary-wheel output shaft are coupled to each other via a coupled section so as to rotate in relation to each other, and wherein a stopper mechanism configured to limit a relative rotation amount of the damper device is provided in the coupled section.

20. The transfer device of claim 19, wherein the auxiliary-wheel output shaft also functions as an outer joint member of the universal joint.

* * * * *